United States Patent [19]

Muller et al.

[11] 3,821,157
[45] June 28, 1974

[54] THERMOPLASTIC BINDERS FOR CONTINUOUSLY PRODUCED LEADS FOR PENCILS, COPYING PENCILS AND COLOURED PENCILS

[75] Inventors: Karl-Heinz Muller, Leverkusen; Harry Rohr, Cologne; Karl-Heinz Ott, Leverkusen, all of Germany

[73] Assignee: Bayer Aktiengesellschaft, Leverkusen, Germany

[22] Filed: May 17, 1973

[21] Appl. No.: 361,186

Related U.S. Application Data

[63] Continuation of Ser. No. 147,648, May 27, 1971, which is a continuation of Ser. No. 755,779, Aug. 28, 1968, abandoned.

[30] Foreign Application Priority Data
Oct. 4, 1967    Germany.............................. 53672

[52] U.S. Cl. .......... 260/42.47, 260/41 B, 260/41 C, 106/19, 260/42.49
[51] Int. Cl. ........................ C08f 45/06, C08f 45/08
[58] Field of Search ........ 260/41 R, 41 C, 28.5 AV; 106/19

[56] References Cited
UNITED STATES PATENTS

| | | | |
|---|---|---|---|
| 3,262,904 | 8/1961 | Ripley.................................. | 260/41 |
| 3,358,054 | 12/1967 | Hardt et al.......................... | 260/878 |
| 3,360,489 | 12/1967 | Grossman............................ | 260/23 |

*Primary Examiner*—Morris Liebman
*Assistant Examiner*—Richard Zaitlen
*Attorney, Agent, or Firm*—Connolly and Hutz

[57] ABSTRACT

Leads for writing purposes comprising a graft polymer of an ethylene/vinyl acetate copolymer, a vinyl chloride and a graft copolymer of a styrene and an acrylonitrile type monomer onto a butadiene polymer and graphite or a scouring agent.

4 Claims, No Drawings

THERMOPLASTIC BINDERS FOR CONTINUOUSLY PRODUCED LEADS FOR PENCILS, COPYING PENCILS AND COLOURED PENCILS

CROSS-REFERENCE TO RELATED APPLICATIONS

This application is a continuation of application Ser. No. 147,648 filed May 27, 1971 and now abandoned, which, in turn, was a continuation of application Ser. No. 755,779 filed Aug. 28, 1968 and now abandoned.

This invention relates to thermoplastic binders for continuously produced leads for pencils, copying pencils and coloured pencils, and to the leads themselves.

Hitherto, two methods have been used for manufacturing leads for writing purposes, namely:

1. The production of ordinary pencil leads with graphite as the colouring agent.
2. The production of leads for coloured pencils and copying pencils with special dyes as the colouring agents.

The first of these two processes is conventionally carried out as follows:

A mixture of powdered graphite, suspended clay and water is first intensively mixed and then extruded under high pressure through a die. The resulting strand of lead, suitably supported, is dried and baked at a suitable temperature and under suitable climatic conditions.

Apart from the lengthiness of this process, due to the complicated drying and tempering operations, it has the following disadvantages:

a. Considerable difficulties are involved in maintaining a uniform thickness of the lead,
b. Cracks often develop during drying, despite all the precautions taken to prevent this, and
c. Even after drying, the leads are readily broken so that they can only be produced in limited lengths.

The second of the two processes for the production of coloured leads has been substantially simplified over a period of time by the following procedure:

A mixture of dye, filler, lubricant, binder and of a monomeric vinyl compound, for example vinyl acetate or styrene, is homogenised under heat in a kneading machine in the presence of an organic peroxide, and the resulting moulding compositions is extruded through a single-screw extruder to form a strand of lead after it has been additionally pre-plasticised at elevated temperature. In addition to the vinyl polymer thus obtained, which acts also as a binder, a wide variety of cellulose esters have heretofore been used as special binders. Inorganic materials, for example, clay or talc, are primarily used as fillers.

Although a process of this kind may be eminently suitable for the production of coloured leads, it cannot be used for the production of ordinary leads because inorganic fillers or dyes such as graphite can only be used in quantities of up to about 50 percent by weight, based on the mixture as a whole. With higher graphite and filler contents, the resulting strand of lead increases in fragility and is deprived of its homogeneity so that the writing composition can no longer be extruded. This limit to the filler content is explained by the nature of the hitherto used binders which, although partly thermoplastic, are only able to absorb a limited quantity of filler and dye and which, when used in fairly large quantities, lose their binding power owing to their resin-like character. To produce leads for pencils, however, the composition should advantageously have a relatively high graphite content, because the quality of the pencil lead is judged by its chalking capacity, which in turn is governed by the amount of colouring agent (for example graphite) present.

Although this state of affairs has been appreciated for some considerable time in writing lead technology, all attempts to find a binder suitable for the continuous production of leads with a filler content in excess of 50 percent by weight have so far failed.

It has now been found that this can be done by using the following polymers or polymer combinations as the binders:

A. 1 to 100 parts by weight of a graft polymer of
  a. 25 to 85 percent by weight of an ethylene/vinyl acetate copolymer with a vinyl acetate content of from 20 to 70 percent by weight and preferably from 30 to 55 percent by weight as the base, and
  b. 75 to 15 percent by weight of grafted-on vinyl chloride; this graft polymer may also be replaced either wholly or in part by copolymer (a); and
B. 99 to 0 parts by weight of a graft polymer of
  a. 5 to 60 percent by weight of a butadiene polymer with optionally up to 30 percent by weight of copolymerised styrene, acrylonitrile, isoprene or the lowest alkyl esters of acrylic or methacrylic acid,
  b. 95 to 40 percent by weight of polymerised styrene and acrylonitrile in a ratio by weight from 95:5 to 50:50 wherein these two monomer components may be replaced either wholly or in part by their respective alkyl derivatives; alternatively one or both may be replaced either wholly or in part by methyl methacrylate;

all or part of the styrene or acrylonitrile having been polymerised in the presence of the butadiene polymer and the residual component of styrene and acrylonitrile added in the course of a partial graft polymerisation reaction, optionally even in separately copolymerised form.

This discovery was completely surprising and could not be derived from the prior art. It is possible, by using the aforementioned polymers or polymer combinations, to produce, for example, writing leads containing up to 90 percent by weight of graphite and which can be extruded through a conventional extruder to form a continuous strand of lead of uniform thickness and of any length, without any breakages in the strand of lead. In addition, it is possible by varying the binder, lubricant, filler and dye contents to adjust any required degree of hardness without in any way detrimentally influencing the procedure.

In one particular preferred embodiment, the following polymer combination is used as a binder in particular for the continuous production of pencil leads:

A. 1 to 100 parts by weight of a graft polymer of
  a. 25 to 85 percent by weight of an ethylene/vinyl acetate copolymer with a vinyl acetate content of from 20 to 70 percent by weight, and preferably 30 to 55 percent by weight, and
  b. 75 to 15 percent by weight of grafted-on vinyl chloride; and
B. 99 to 0 parts by weight of a graft polymer of a. 5 to 60 percent by weight of a butadiene polymer with optionally up to 30 percent by weight of copolymerised styrene, b. 95 to 40 percent by weight of polymerised styrene and acrylonitrile in a ratio by weight of 95:5 to 50:50 wherein these two monomer components may be replaced either wholly or in part by their respective alkyl derivatives, or alternatively one or both of them may be replaced either wholly or in part by methyl methacrylate;

all or part of the styrene and acrylonitrile having been polymerised in the presence of the butadiene polymer and the residual components of styrene and acrylonitrile, optionally in separately copolymerised form, having been added in the course of a partial graft polymerisation reaction.

According to another preferred embodiment, the graft polymer component (a) and the graft polymer compoment (b) are employed in a weight ratio of from 80:60 to 20:40.

The polymers, copolymers and graft copolymers required for the binders used according to the invention are obtained by conventional processes. Thus, German Patent Specification No. 1,126,613, for example, describes the preparation of ethylene/vinyl acetate copolymers, whilst Belgian Patent Specification No. 510,460 provides full details of suitable graft polymers of vinyl chloride on ethylene/vinyl acetate copolymers. The same also applies as regards the polymer component B) which is prepared in accordance with the procedure generally employed for acrylonitrile/butadiene/styrene polymers (ABS-polymers). Details of the procedure adopted for the preparation of ABS-polymers may be found, for example, in British Patent Specification No. 794,400 and in German Patent Application No. F 44,156 IV$d$/39$c$. It should be emphasised in this respect, however, that the preparation of polymers such as these is not necessarily restricted to an emulsion polymerisation process because, on the other hand, it is also possible to prepare ABS-polymers by suspension or mass bead polymerisation processes.

In another modification of the process according to the invention, it is also possible to replace the graft polymer component (B) of the binder combination according to the invention by a so-called ABS-copolymer. Products of this kind are prepared by mixing a rubber-like copolymer, for example, a butadiene/styrene copolymer, with a resin-like copolymer, for example a styrene/acrylonitrile copolymer, in suitable proportions.

The butadiene polymer used as graft base in the preparation of graft polymer component (B) is initially restricted to a comonomer component of 30 percent by weight. When ethyl acrylate or butyl acrylate or alkyl vinyl ethers are used, this comonomer component may, however, be increased to from 50 to 70 percent by weight, without substantially affecting the elastomeric properties of the graft base.

The writing lead composition required for carrying out the continuous lead manufacturing process is produced by introducing polymer component (A) or polymer components (A) and (B) into a mixer to which plasticisers, bonding agents and lubricants, a colouring agent and, optionally, a filler are simultaneously added. If polymer component (A) is a graft polymer containing vinyl chloride, a PVC stabiliser has also to be added. The usual PVC stabilisers (PVC = polyvinyl chloride), for example basic lead sulphates, barium/cadmium soaps or organotin compounds, may be used for this purpose. Suitable mixing units include, for example, mixing rolls, internal kneaders, high speed mixers or fluid mixers.

Initially, the quantities in which the additives are used are governed solely by the quantities in which the colouring agent and the binder are employed. By virtue of the properties of the binder used according to the invention, a high proportion of the colouring agent may be employed, in which case the quantities of the other additives or fillers are reduced accordingly.

In addition, it is possible, by varying the type and quantitative ratio of polymer components (A) and (B), to influence both the properties and the hardnes of the leads without in any way affecting the possibility of adjusting the hardness of the leads by means of other additives. When the binder according to the invention is used, the content of colouring agent may be increased, depending upon the type of lead (ordinary lead or coloured lead) to up to 90 percent by weight, based on the mixture as a whole, without in any way affecting the possibility of manufacturing a continuous lead.

The dyes normally used in writing lead technology, for example graphite, inorganic or organic pigments and pure organic dyes, may be used as the colouring agent, providing their thermal stability is such as to allow extrusion. The following are mentioned by way of example: iron oxides, cadmium sulphides and selenides, carbon blacks, chromium oxides and phthalocyanines.

Suitable bonding agents and lubricants include the substances normally used for this purpose in the production of writing leads, for example, fats and waxes, alkali metal and alkaline earth metal salts or stearic acid, stearyl alcohol and, in another preferred embodiment of the process, the bis-stearyl amide of ethylene diamine.

When the binder or binder combination according to the invention is used, in this particular context polymer component (A), it is also possible to add fairly small quantities of a plasticiser, for example a phthalic acid, adipic acid on phosphoric acid ester, or a reaction product of a fairly long chain alkyl sulphonic acid with a monohydric or polyhydric phenol.

In order to adjust the required degree of hardness, the hardeners normally used in the manufacture of writing leads, for example, kaolin or powdered quartz, may be added.

The writing lead composition according to the invention may be extruded in conventional single-screw or twin-screw extruders. In order to obtain uniform distribution, however, it has proved to be of advantage to use a twin-screw extruder. The processing temperatures used are governed solely by the type of colouring agent employed and by the composition of the binder used according to the invention. As a rule, processing temperatures in the range from 170° to 200°C. are preferred.

It is possible by applying the process according to the invention and by using the binder according to the invention continuously to produce strands of ordinary lead or coloured lead of any length and of constant diameter which combine high breaking strength with excellent chalking properties. The leads may be produced in all the thicknesses normally used for lead pencils and coloured pencils or art pencils. The diameter and shape of the lead are governed solely by the shape and diameter of the nozzle attached to the processing machine. Although an extrusion die 2.3 mm. in diameter is normally used for this purpose, it is also possible to use an extrusion die with a diameter of, for example, 10 mm., or a die with a triangular or rectangular outlet. In addition, it is possible to vary the composition of the binder used according to the invention in such a way as to obtain leads of any hardness. The process according to the invention and the binder according to the invention are illustrated by the following Examples. Unless otherwise stated, the parts and percentages indicated are parts and percentages by weight.

EXAMPLES 1 – 6

The following constituents are introduced into and homogenised in a high speed beater mill:

|  | Example |  |  |  |  |  |
|---|---|---|---|---|---|---|
|  | 1 | 2 | 3 | 4 | 5 | 6 |
| Polymer component A (parts) Graft polymer of 40% by weight of vinyl chloride, 23% by weight of vinyl acetate, 37% by weight of ethylene | 180 | 160 | 120 | 80 | 40 | 60 |
| Polymer component B (parts) comprising a) 30% by weight of a graft polymer of 35% by weight of styrene and 15% by weight of acrylonitrile on 50% by weight of polybutadiene b) 70% by weight of styrene/acrylonitrile copolymer 70:30, $\eta_i$ = 0.60 (0.5% solution in dimethyl formamide at 20°C.) | 20 | 40 | 80 | 120 | 160 | 180 |
| Alkyl sulphonic acid ester (parts) of phenol with an alkyl radical of 15 carbon atoms | 10 | 10 | 10 | 10 | 10 | 10 |
| Barium cadmium laurate (parts) | 10 | 10 | 10 | 10 | 10 | 10 |
| Ethylene diamine bis-stearyl amide (parts) | 40 | 40 | 40 | 40 | 40 | 40 |

After thoroughly mixing, 750 parts of graphite are added in each instance, and the mixture as a whole is transferred to a laboratory ball mill after further homogenisation. The mixtures are each ground in this ball mill for 30 minutes and then extruded by means of a twin-screw extruder through an extrusion die. The processing temperature is 180°C. The resulting strand of lead is drawn off and rolled up or cut to lengths, depending upon the degree of hardness adjusted. Despite their high graphite content (74.2 percent by weight), the finished leads show a uniform diameter of 2.2 mm. and a high breaking strength. Their chalking properties are excellent.

EXAMPLE 7

The procedure is as described in Example 1, except that in this instance polymer component B is not added. Instead, the quantity in which polymer component A is used is increased to 200 parts by weight. A strand of lead of outstanding flexibility and high breaking strength is obtained.

EXAMPLE 8

150 parts by weight of an ethylene/vinyl acetate copolymer with a vinyl acetate content of 45 percent by weight and a Mooney viscosity of 20 (ML-4'-value) are compacted to form a sheet on mixing rolls at a temperature of 140°C. Following the addition of 50 parts by weight of the polymer component B already described in Example 1, the following constituents are added after continued rolling:

10 parts by weight of benzyl octyl adipate
40 parts by weight of calcium stearate, and
750 parts by weight of graphite.

The rolled sheet is drawn off and granulated. The granulate thus obtained is further processed as described in Example 1. The finished strand of lead has a high breaking strength and excellent chalking properties.

EXAMPLE 9

The following components are homogenised on mixing rolls:

200 parts by weight of an ethylene/vinyl acetate copolymer with a vinyl acetate content of 45 percent by weight (ML-4' = 20),
40 parts by weight of the bis-stearyl amide of ethylene diamine,
10 parts by weight of dibutyl phthalate, and
750 parts by weight of graphite The product is further processed as described in Example 8, the only difference being that component B is not added.

Following granulation, a strand of lead of outstanding flexibility is again extruded through a twin-screw extruder.

EXAMPLE 10

The following components are introduced into a high speed beater mill:
120 parts by weight of the polymer component (A) already described in Example 1,
80 parts by weight of the polymer component (B) described in Example 1,
10 parts by weight of the alkyl sulphonic acid ester of phenol, having an alkyl radical of 15 carbon atoms,
10 parts by weight of barium cadmium laurate,
40 parts by weigt of calcium stearate.

After thorough mixing, the following components are added:

400 parts by weight of a calcium sulphide selenide pigment (Cadmopurrot 400 [a registered trade mark of Farbenfabriken Bayer AG]),
400 parts by weight of talc.

After intensive grinding in a ball mill, the lead composition is again extruded through a twin-screw extruder to form a uniform strand of lead 5 mm. in diameter. A red lead with outstanding chalking properties, high flexibility and equally high breaking strength is obtained.

EXAMPLE 11

A lead of the following composition is prepared in accordance with the procedure described in Example 2:

160 parts by weight of the polymer component (A) already described in Example 2,
40 parts by weight of a graft polymer of 80 percent by weight of styrene/acrylonitrile in a weight ratio of 70:30 on 20 percent by weight of a butadiene/styrene copolymer in a weight ratio of 80:20,
10 parts by weight of barium cadmium laurate,
10 parts by weight of dibutyl phthalate,
40 parts by weight of the bis-stearyl amide of ethylene diamine,
750 parts by weight of graphite.

The lead composition according to the invention is again extruded through a twin-screw extruder as described in Examples 1 to 6. A strand of lead of high breaking strength and excellent chalking properties is also obtained with a composition of this kind.

EXAMPLE 12

If the polymer component (B) of Example 4 is replaced by a graft polymer of 50 percent by weight of styrene/acrylonitrile on 50 percent by weight of polybutadiene, a strand of lead of outstanding elasticity is obtained after the moulding composition has been worked up as described in Examples 1 to 6.

We claim:

1. A pencil lead comprising an extruded intimate admixture of 50 to 90 percent by weight of graphite or other pencil coloring agent capable of chalking and 50 to 10 percent by weight of a binder comprising a mixture of
   A. 1 to 100 parts by weight of a graft copolymer of 25 to 85 percent by weight of an ethylene/vinyl acetate copolymer having a vinyl acetate content of from 20 to 70 percent by weight as grafting substrate and 75 to 15 percent by weight of grafted on vinyl chloride,
   B. 99 to 0 percent by weight of a graft copolymer or a graft polymer-copolymer mixture comprising
      a. 5 to 60 percent by weight of a butadiene homopolymer or a copolymer of butadiene and up to 30 percent by weight of copolymerized styrene and
      b. 95 to 40 percent by weight of (1) polymerized styrene, methylmethacrylate or a mixture thereof and (2) acrylonitrile methylmethacrylate or a mixture thereof in a ratio by weight of 95:5 to 50:5 wherein (b) is at least partially grafted on (a) and any remainder of (b) is present as the copolymer in said graft polymer-copolymer mixture.

2. The pencil lead of claim 1 wherein (A) has a vinyl acetate content of from 30 to 55 percent by weight.

3. The pencil lead of claim 1 wherein graphite is the pencil coloring agent capable of chalking.

4. The pencil lead of claim 1 wherein (A) comprises a graft polymer of 40 percent by weight of vinyl chloride, 23 percent by weight of vinyl acetate and 37 percent by weight of ethylene and (B) comprises a mixture of 30 percent by weight of a graft polymer comprising 30 percent by weight of styrene and 50 percent by weight of acrylonitrile grafted on 50 percent by weight of polybutadiene and 70 percent by weight of a copolymer of styrene and acrylonitrile in a ratio of 70:30.

* * * * *